United States Patent [19]
Rodder

[11] Patent Number: 5,981,441
[45] Date of Patent: Nov. 9, 1999

[54] USE OF METHANOL FOR IMPROVING PLANT GROWTH

[76] Inventor: Jerome A. Rodder, 775 Sunshine Dr., Los Altos, Calif. 94022-3155

[21] Appl. No.: 08/967,448

[22] Filed: Nov. 11, 1997

Related U.S. Application Data

[63] Continuation-in-part of application No. 08/886,058, Jun. 30, 1997, abandoned, which is a continuation of application No. 08/417,151, Apr. 3, 1995, Pat. No. 5,642,586, which is a continuation-in-part of application No. 08/188,046, Jan. 26, 1994, abandoned.

[51] Int. Cl.⁶ ............................... A01N 31/02; C05G 3/00
[52] U.S. Cl. ............................................ 504/353
[58] Field of Search ................................. 504/353

[56] References Cited

U.S. PATENT DOCUMENTS

| | | | |
|---|---|---|---|
| P.P. 2,716 | 2/1967 | McDade | Plt./87.3 |
| P.P. 2,777 | 11/1967 | Fitzgerald | Plt./87.3 |
| P.P. 3,836 | 3/1976 | Lecoufle | Plt./87.3 |
| P.P. 5,688 | 3/1986 | Germaske | Plt./87.3 |
| 3,472,647 | 10/1969 | Miller | 71/122 |
| 3,915,686 | 10/1975 | Miller | 504/353 |
| 5,597,400 | 1/1997 | Nonomura et al. | 71/28 |
| 5,642,586 | 7/1997 | Rodder | 47/58 |

OTHER PUBLICATIONS

*Proceedings of the National Acadamy of Sciences of the United States of America*, Oct. 15, 1992, vol. 89, No. 20, pp. 9794–9798, "The Path of Carbon in Photosynthesis: Improved Crop Yields with Methanol," A.M. Nonmura and A.A. Benson.

*HortScience*, vol. 31(7), Dec. 1996, pp. 1092–1096, "The Role of Methanol in Promoting Plant Growth: A Current Evalution," McGiffen, Jr. and Manthey.

*Primary Examiner*—S. Mark Clardy
*Attorney, Agent, or Firm*—Christie, Parker & Hale, LLP

[57] ABSTRACT

A method for improving the growth characteristics of plants of the $C_3$ and CAM varieties comprises applying to the roots of the plants an aqueous solution containing methanol together with a high nitrogen fertilizer. The fertilizer comprises an N—P—K fertilizer having a high nitrogen content, preferably a 24-6-6 value, in which the nitrogen component is provided principally by ammonium nitrate, potassium nitrate and ammonium phosphate. Use of urea as a nitrogen source in the fertilizer formulation is essentially avoided. Greatly improved growth characteristics have been demonstrated in comparative experimental tests with a large variety of $C_3$ and CAM family fruits, vegetables, flowering plants and trees.

25 Claims, No Drawings

USE OF METHANOL FOR IMPROVING PLANT GROWTH

CROSS REFERENCE TO RELATED APPLICATION

This is a continuation-in-part of application Ser. No. 08/886,058, filed Jun. 30, 1997, now abandoned, which is a continuation of application Ser. No. 08/417,151, filed Apr. 3, 1995, now U.S. Pat. No. 5,642,586, which is a continuation-in-part of Ser. No. 08/188,046, filed Jan. 26, 1994, abandoned.

FIELD OF THE INVENTION

The present invention relates to a method of improving the growth characteristics of plants by applying an aqueous solution of methanol and a high nitrogen fertilizer to the plant roots.

BACKGROUND OF THE INVENTION

My U.S. Pat. No. 5,642,586 describes a method of improving the growth characteristics of orchid plants which comprises applying to the roots of the plants an aqueous solution containing methanol and a fertilizer. The application of methanol to the orchid plant roots produces earlier flowering and more shoots and increases high temperature tolerance, root vigor, bright light tolerance, and foliage glossiness or shininess.

The present invention is based on the recognition that an aqueous solution containing methanol and a high nitrogen fertilizer applied to the plant roots of a large number of different plant varieties beyond the orchid family produces remarkable growth enhancement of the plants treated with the methanol/high nitrogen fertilizer solution.

The use of methanol for promoting plant growth has been reported throughout the scientific literature in recent years. Perhaps the leading article in the field is authored by Nonomura A. M. and A. A. Benson, 1992, "The Path of Carbon in Photosynthesis: Improved Crop Yields With Methanol," *Proc. Natl. Acad. Sci.*, 89:97 94–97 98, who reported remarkable growth enhancement of $C_3$ plants treated with methanol. A methanol solution sprayed on the leaves of a variety of $C_3$ plants such as tomatoes, strawberries, eggplant, cotton, cabbage, wheat, rose, palm and watermelon produced enhanced growth characteristics. Other positive responses to plants treated with methanol also have been reported in the literature. However, more publications relating to this subject have reported no evidence of growth gain. These contradictory results have left the usefulness of methanol treatment unresolved.

A recent article by McGiffen, Jr., M. E. and J. A. Manthey, "The Role of Methanol and Promoting Plant Growth: A Current Evaluation," *Hort. Science*, Dec. 19, 1996, 31(7): 1092–1096, evaluated a large number of studies and concluded that the overwhelming evidence from the scientific literature is that methanol is not a reliable stimulant to crop productivity; and that although the methods have not been consistent across all of the studies, investigations that duplicated Nonomura and Benson's procedures failed to find consistent increases in crop yield. McGiffen et al. concluded that additional field experiments that simply repeat Nonomura and Benson's protocol are unlikely to provide new insights, and that the foliar application of methanol is unlikely to become a practical yield enhancer.

The present invention is based on the recognition that, contrary to the McGiffen et al. study, methanol can be used to promote plant growth. According to the present invention, a methanol-enhanced aqueous solution of a high nitrogen fertilizer applied to the plant roots produces remarkable improvements in many growth characteristics of $C_3$ plants. Moreover, such plant growth improvement has been produced in a variety of $C_3$ plant species including fruits, vegetables, trees and flowering plants. Improved growth in CAM variety plants also has been demonstrated.

SUMMARY OF THE INVENTION

Briefly, the present invention comprises a method of improving the growth characteristics of plants by applying to the roots of the plants an aqueous solution of methanol and a nitrogen-phosphorus-potassium (N—P—K)-based fertilizer having a high nitrogen content. The invention is based on a recognition of the role of nitrogen when using methanol for growth enhancement. The source of the nitrogen used in the methanol-enhanced fertilizer component is critical. There are a variety of available nitrogen-based chemicals used in fertilizers. These include urea which is broken down slowly during use. Urea as a source of nitrogen is substantially avoided in the present invention. The preferred nitrogen source is a fast-acting nitrogen component selected from the group which includes nitrate ions and ammonium ions. Preferably, the nitrogen source is provided principally by ammonium nitrate, ammonium phosphate and potassium nitrate. The ammonium phosphate and potassium nitrate components also provide the phosphorus and potassium components of the N—P—K fertilizer formulation. The preferred high nitrogen fertilizer has an N—P—K ratio in the range from about 3.5:1:1 to about 8:1:1, with the presently preferred fertilizer formulation comprising a 24-6-6 (4:1:1) blend. The invention, as described in more detail below, demonstrates remarkable enhanced growth characteristics for a large number of $C_3$ and CAM plant varieties.

DETAILED DESCRIPTION

My U.S. Pat. No. 5;642,586, which is incorporated herein by this reference, describes development of a method for improving the flowering and shoot growth and glossiness of the foliage of orchid plants by applying to the roots of the plants an aqueous solution containing methanol and a fertilizer. The patent describes how initially a very dilute aqueous solution of 0.01% methanol was added to a standard fertilizer solution and applied to orchid plant roots by saturating the fir bark growing media. No damage or toxic effects to the plant were observed by repeated application to the same plant. Subsequently, a solution of 0.17% methanol with half strength standard fertilizer known as "DynaGro" (10-5-5, ¼ tsp/gal) was applied to approximately 500 orchid plants at weekly intervals. The solution concentration was doubled (½ tsp/gal) and subsequently plants were treated with full strength fertilizer with increasing percentages of alcohol up to 5% methanol, without any short term toxic effects. Results showed that the methanol treatment improved the flowering, shoot growth and glossiness of the foliage and enhanced the blooming period which took place over 19 months time as opposed to a typical period of three to four years for orchid plants of the same size when no methanol treatment is applied. It has been concluded that up to 2% methanol added to the standard fertilizer/water formulation (5 to 10 cc fertilizer per four liters (approximately one gallon) of water) produces significantly improved orchid growth.

As mentioned, the N—P—K ratio of the "DynaGro" fertilizer that I had previously used on the orchid plants was 10-5-5. During the course of experimentation with fertilizers having different N—P—K values, I added some ammonium nitrate to the fertilizer formulation to increase its nitrogen content. Following months of experimentation with orchid plants, and after adjusting the ratio to 4:1:1 and using a less concentrated solution, optimum growth characteristics were produced in the orchid plants. The preferred N—P—K value was determined to be a value of 24-6-6.

There are several possible sources of the nitrogen component in the N—P—K value for fertilizers, generally. Such nitrogen sources include ammonium nitrate, urea and potassium nitrate. Both ammonium nitrate and potassium nitrate are immediately available to the plant. Although urea is soluble in water, the nitrogen component is not immediately available to the plant. Urea is broken down slowly, and it therefore provides a slow release nitrogen source used in many commercial fertilizers as a fraction of the nitrogen source to lengthen the time release of nitrogen available to the plant.

Carbon dioxide is the most common source of carbon and plants use this gas along with water, fertilizer and light to synthesize the many organic components for plant life. Methanol is another carbon source, but it appears that part of the action of methanol is to keep the statoma (where gas exchange takes place in the leaves) open longer in order to absorb more carbon dioxide. It is converted first to formaldehyde and then to various sugars. Supplementing standard fertilizers with methanol increases plant growth in some instances because there is usually some extra nitrogen available. However, the form of the nitrogen may not be optimal when methanol is used in combination with a fertilizer. There are a variety of nitrogen-based chemicals used in fertilizers. In the Nonomura et al. article described previously, methanol was added to a urea-based nitrogen source. On the other hand, nitrate ions (not available from urea) are immediately available to plants, and ammonium ions are converted rapidly by bacteria to the nitrate form.

Standard fertilizers typically include a substantial percentage of urea. In addition, there are some ammonium and nitrate components. The reason for these mixtures is to supply the nitrate ions rapidly to the plant. Then the urea is broken down slowly to continuously supply the required nitrogen. As described in my '586 patent, the fertilizer is applied only to the roots and not used as a foliar spray. Methanol is metabolized rapidly and if not used it will evaporate from the soil.

An important aspect of the fertilizer formulation of this invention is the N—P—K value. There are many fertilizer formulas available such as 10-5-5, 30-10-10, 15-10-30, 20-5-19, 20-20-20, 20-30-20, 7-7-7, 26-14-16, plus numerous other custom blends. The nitrogen sources in various known fertilizer formulations usually contain considerable amounts of urea. In the present invention, it is desirable to keep the total amount of salt reasonably low since plants are sensitive to salt concentration. Thus, to keep the salt concentration low while having a high concentration of nitrogen, the P and K concentrations are kept relatively low. The N—P—K value of 24-6-6 has been tested on a large variety of $C_3$ and CAM plants and thus far none of the plants tested has suffered from a deficiency of potassium or phosphorous. Contrary to the conclusions of the McGiffen et al. article described previously, I have discovered that methanol added to a fertilizer solution and applied to the roots of $C_3$ and CAM plants, in addition to orchids, can produce a wide variety of enhanced growth characteristics. The development of this invention involves use of a high nitrogen N—P—K fertilizer in which the nitrogen component is in the range of about 3.5:1:1 to about 8:1:1. The preferred N—P—K content is 24-6-6 (4:1:1). The invention requires use of a fast-acting nitrogen source and avoids use of a slow-acting nitrogen source such as urea. In one experiment, an 18% urea fertilizer added to methanol produced no enhanced growth characteristics and was dramatically different from the greatly improved growth characteristics of the same plant when utilizing the formulation of this invention. The preferred source of nitrogen is from ammonium ions and nitrate ions, predominantly ammonium nitrate, potassium nitrate and ammonium phosphate. The preference for using ammonium nitrate is to keep the salt content (from potassium and phosphorous) low because too much salt can burn the leaves of the plant. The preferred ratio of potassium to phosphorous in the formulation is about 1:1 although variations in the range from about 2:1 to 1:2 are possible.

The presently preferred methanol/fertilizer formulation comprises one part by volume 24-6-6 fertilizer, two parts by volume water, and one part by volume methanol. The methanol is a 100% solution (containing no water). The 24-6-6 fertilizer blend is initially prepared by mixing granular ammonium nitrate, ammonium phosphate and potassium nitrate in the previously described 24-6-6 amount on a percentage weight basis. The total nitrogen (24%) comprises 11.5% nitrate nitrogen and 12.5% ammoniacal nitrogen. There is 6% available phosphorus ($P_2O_5$) and 6% potassium ($K_2O$). Minor elements (all chelated consist of iron (0.2%), manganese (0.07%), boron (0.01%), copper (0.05%), molybdenum (0.006%), magnesium (0.48%), sulfur (1.10%) and cobalt (0.005%)). The granular mixture dissolves in the water/methanol blend. The preferred ratio of methanol to fertilizer is one part granular fertilizer to one part methanol, by volume, to produce a basic growth formulation. The ratio of methanol to fertilizer can be up to about two parts methanol to one part fertilizer, by volume, to provide larger blooms during the September to February growth cycles for orchids. Each plant variety has its own blooming period.

Comparative studies evaluated the 24-6-6 methanol/high nitrogen formulation of this invention compared to use of the methanol/fertilizer formulation described in my '586 patent, in which the methanol was blended with the Dyna-Gro (10-5-5) fertilizer formulation. Both formulations were applied to the roots of similar orchid plants in the same amounts and over the same time intervals. The results showed that the methanol-enhanced high nitrogen fertilizer of this invention produced faster root growth, higher flower production with larger flower and richer colors, more than doubling of most plant growth, prevention of unfavorable decomposition of the fir bark growth media, production of shinny fat pseudobulbs and shinier leaves, and improved plant growth in higher temperatures, increased light levels and lower humidity environments.

The present invention has been expanded beyond orchids to a large variety of $C_3$ and CAM plants, and in all instances in which the fertilizer was applied to the plant roots, improved growth characteristics resulted. Basically there are three different biochemical reactions which plants use in the photosynthesis of the various chemicals. They are in simplified terms referred to as $C_3$, $C_4$ and CAM. For orchids the thin leaved variety are classified as $C_3$ plants. All thick leaved orchids are in the CAM class. There is no evidence of $C_4$ orchids. The present invention provided improved growth characteristics of orchids of both the $C_3$ and CAM families. $C_4$ plants have photosynthetic rates up to three times higher than $C_3$ plants and are located in high light intensity, high temperature and dry areas. Examples of $C_4$ plants are corn, sugar cane and sorghum. Depending upon the temperature, different grasses can be either $C_3$ or $C_4$. For example, the cool growing grasses are $C_3$ and the warmer growing ones are $C_4$. Most of the temperate plants are either $C_3$ or CAM. The 24-6-6 high nitrogen fertilizer/methanol solution of this invention has been successfully tested on the following $C_3$ and/or CAM plants and trees: citrus, cantaloupe, raspberry, strawberry, watermelon, beans, daylily, ferns, canna, lantana, Japanese maple, gardenia, pepper, lettuce, rose, tomato, cyclamen, dahlia, petunia, African violet, vinca, pansy, quince, clematis, papyrus, Chinese lantern, Iceland poppy, marigold, and stock. Improved results for some of these plants are described below.

One dramatic example of improved results was an orange tree which had almost all yellow leaves for four years and simply did not grow. After one application of the fertilizer of this invention, new shoots appeared all over the branches within about one week. The leaves are now deep green, and an abundance of oranges on the tree were produced by the continued periodic application of the fertilizer to the roots of the tree. The results of the present invention with respect to citrus trees contradicts the conclusions of the McGiffen et al. article, referred to previously, which states that methanol does not improve the growth characteristics of citrus trees.

A number of flowers grown with the 24-6-6 high nitrogen/methanol solution of this invention were compared with methanol-enhanced fertilizers from Miracle Gro and Peters. The result showed that the higher concentration of urea as a nitrogen source, the less the benefit that methanol exhibits.

In one experimental test, a high nitrogen fertilizer (approximately 24-6-6) was applied to the plant roots of orchids in the absence of methanol. The high nitrogen content resulted in killing the plants.

One orchid plant (*Encyclia tampensis alba* 'Mendenhall') treated with the 24-6-6 high nitrogen fertilizer/methanol solution of this invention produced 108 stems and 1,760 flowers.

Other orchid plants have been the subject of comparative tests utilizing the high nitrogen fertilizer/methanol solution of this invention compared with similar plants utilizing "DynaGro" (10-5-5) and the same amount of methanol. Growth improvements provided by the fertilizer/methanol solution of this invention included higher growth rate and density of roots; larger root diameters; larger pseudobulbs; larger leaves and taller plants; more and larger flowers; no observable decomposition of root bark growth medium; greater light tolerance—plants grow better in 50% more light than usually recommended; greater tolerance of high temperatures; and better tolerance to low relative humidity.

The following $C_3$ plants grown side-by-side in separate pots showed remarkably better growth with the 24-6-6 fertilizer/methanol solution of this invention compared to use of a "DynaGro" (10-5-5) fertilizer mixed with the same amount of methanol: tomato (larger stems, more compact growth), strawberry (larger stems, more compact leaves), violet (much larger plant), petunia (more flowers, larger more compact growth), marigold (more flowers), vinca (more flowers, larger more compact growth), cattleya orchid (*C. Keowee*) (greater number of blooming cycles (three times) over the same time period), and chrysanthemum palmdosum (greater more compact growth, more stems, more compact growth, many more buds). Cantaloupe (almost double the plant size, many more blooms) and tomato (much larger plants, many more blooms) grown side by side in a field showed much improved growth characteristics with the high nitrogen fertilizer/methanol solution of this invention. The growth characteristics were compared using the fertilizer of this invention compared to the use of DynaGro (10-5-5).

EXAMPLE

This example summarizes a study of the 24-6-6 high nitrogen/methanol fertilizer of the present invention by an independent expert.

Twenty four seedling Phalaenopsis plants were divided by random selection into four groups of six each. Each plant was weighed on an Ohaus Harvard beam balance of laboratory grade. By random selection four plants were potted in straight long-fiber sphagnum and two plants in O&F mix (50/50#3 charcoal and #3 sponge rock) to which ⅛ by volume MetroMix 200 was added in each set of six. Plants were potted in typical blow mold sixpacks of nominal 3.5-inch pot size. The methanol/high nitrogen fertilizer was mixed in one gallon batches of one, two and three teaspoons per gallon strength with distilled water used as makeup for one gallon volume. Plants were labeled for application of each strength and one tray was tagged as control to receive normal treatment.

The growing area was a 30×40 greenhouse, bench height 34 inches, light intensity was 3742 fc at midday, and greenhouse temperature reached a maximum of 82° F., but had an ambient low temperature of 74° F. Normal care for Phalaenopsis seedlings is 200 ppm N—P—K fertilizer every ten days with a soft water flush the fourth day after feeding.

Plants were watered one day and fed the next day on a weekly schedule. The control plants were on the greenhouse schedule, not the weekly application program. Testing began Aug. 9, 1997, and terminated Oct. 13, 1997, at which time all plants were removed from pots, carefully cleaned and weighed. The results were as follows:

| POT ID - MEDIUM | START DATE 09 Aug 97 | END DATE: 13 Oct 97 |
|---|---|---|
| A: CONTROL GROUP | | |
| A-Sphagnum | 8.7 g | 9.3 g |
| B-Sphagnum | 8.5 g | 11.9 g |
| C-Sphagnum | 8.4 g | 9.2 g |
| D-Sphagnum | 8.4 g | 9.5 g |
| E-O&F | 5.7 g | 10.1 g |
| F-O&F | 7.6 g | 12.2 g |
| Total Gain: 14.9 g | Total Weight: 47.3 g | Total Weight: 62.2 g |
| B: 1 TSP/GAL | | |
| A-Sphagnum | 6.7 g | 10.0 g |
| B-Sphagnum | 7.5 g | 13.2 g |
| C-Sphagnum | 9.2 g | 14.6 g |
| D-Sphagnum | 9.3 g | 17.5 g |
| E-O&F | 5.4 g | 5.8 g |
| F-O&F | 7.5 g | 11.4 g |
| Total Gain: 26.9 g | Total Weight: 45.6 g | Total Weight: 72.5 g |
| C: 2 TSP/GAL | | |
| A-Sphagnum | 6.9 g | 17.3 g |
| B-Sphagnum | 12.1 g | 15.5 g |
| C-Sphagnum | 8.2 g | 16.2 g |
| D-Sphagnum | 7.2 g | 13.0 g |
| E-O&F | 8.2 g | 15.9 g |
| F-O&F | 7.3 g | 17.4 g |
| Total Gain: 45.4 g | Total Weight: 49.9 g | Total Weight: 95.3 g |
| D: 3 TSP/GAL | | |
| A-Sphagnum | 9.1 g | 10.2 g |

-continued

| | | |
|---|---|---|
| B-Sphagnum | 9.4 g | 12.4 g |
| C-Sphagnum | 10.0 g | 16.1 g |
| D-Sphagnum | 7.4 g | 9.9 g |
| E-O&F | 7.3 g | 15.6 g |
| F-O&F | 7.3 g | 14.3 g |
| Total Gain: 29.6 g | Total Weight: 50.5 g | Total Weight: 78.1 g |

RECAP OF RESULTS

| GROUP | Start Wt. | End Wt. | Gain (g) | Gain (%) |
|---|---|---|---|---|
| A-CONTROL GROUP | 47.3 g | 62.2 g | 14.9 g | 31.5 |
| B-ONE TSP/GAL | 45.6 g | 72.5 g | 26.9 g | 59.0 |
| C-TWO TSP/GAL | 45.4 g | 49.9 g | 95.3 g | 91.0 |
| D-THREE TSP/GAL | 50.5 g | 78.1 g | 27.6 g | 54.7 |

The control results approximated a normal commercial nursery pot plant operation.

In addition to the above tests an amount of the 24-6-6 methanol/high nitrogen fertilizer was retained from each application and put on miscellaneous plants in a laboratory growing area. Some of the plants were inside but most were outside in the summer growing area. Improvement in plant appearance was remarkable in these areas. Leaf sheen and color improved new root growth was encouraged, and the general thrift of the plants improved. Pigmentation intensity suggests that more and/or larger chlorophyll clusters were being produced. Beginning a day or two after application of the formulation effluent and lasting three to four days, wasps visited the outside plants in unusual numbers. This indicates that the plants were expressing sugar-rich sap through the leaves. The supposition is that the plants were in a very high state of metabolism and producing more food than they could consume. Such a condition would encourage a very high rate of growth. It would also offer some insight into the demonstrated trait of greater heat tolerance as the plants would be venting gaseous water and heat as a by-product of rapid starch sugar energy conversion cycles. The summer growing months were hot and dry, and it appears that the plants became more heat tolerant through the application of the 24-6-6 high nitrogen/methanol formulation.

I claim:

1. A high nitrogen/methanol fertilizer for improving the growth characteristics of plants of the $C_3$ and CAM varieties when applied to the roots of the plant, comprising an aqueous solution containing methanol and a high nitrogen N—P—K fertilizer in which the nitrogen content comprises from about 3.5 to about 8 times the amount of available phosphorus and of available potassium, by weight, substantially in the absence of urea.

2. The high nitrogen/methanol fertilizer according to claim 1 in which the nitrogen content comprises from about 4 to about 8 times the potassium component and the phosphorous component, by weight.

3. The high nitrogen/methanol fertilizer according to claim 2 in which the N—P—K content of the nitrogen to phosphorous to potassium comprises about 24-6-6.

4. The high nitrogen/methanol fertilizer according to claim 2 in which the ratio of methanol to fertilizer is about 1:1 to 2:1 by volume.

5. The high nitrogen/methanol fertilizer according to claim 2 in which the components of the fertilizer principally comprise ammonium nitrate, potassium nitrate and ammonium phosphate.

6. A method of improving the growth characteristics of plants of the $C_3$ and CAM varieties comprising applying to the roots of the plants an aqueous solution containing methanol together with a fertilizer and repeating the application at intervals during the growth cycle of the plant, in which the fertilizer comprises an N—P—K fertilizer having a high nitrogen content in which the nitrogen component comprises from about 3.5 to about 8 times the potassium component and the phosphorous component, by weight, and in which the nitrogen component is provided by ammonium ions and nitrate ions substantially in the absence of urea.

7. The method according to claim 6 in which the N—P—K content of nitrogen to phosphorous to potassium comprises about 24-6-6.

8. The method according to claim 7 in which the ratio of methanol to fertilizer is about 1:1 to about 2:1, by volume.

9. The method according to claim 6, in which the ratio of methanol to fertilizer is about 1:1 to 2:1 by volume.

10. The method according to claim 6 comprising applying the methanol fertilizer solution to the roots of $C_3$ and/or CAM plants and trees selected from the group consisting of citrus, cantaloupe, raspberry, strawberry, watermelon, beans, daylily, fern, canna, lantana, Japanese maple, gardenia, pepper, lettuce, rose, tomato, cyclamen, dahlia, African violet, vinca, pansy, quince, clematis, papyrus, petunia, Chinese lantern, Iceland poppy, marigold and stock.

11. The method according to claim 6 in which the components of the fertilizer principally comprise ammonium nitrate, potassium nitrate and ammonium phosphate.

12. The method according to claim 6 in which the nitrogen component comprises from about 4 to about 8 times the potassium component and the phosphorous component, by weight.

13. A method of improving the growth characteristics of plants of the $C_3$ and CAM varieties comprising applying to the roots of the plants an aqueous solution consisting essentially of methanol and a fertilizer, and repeating the application at intervals during the growth cycle of the plant, in which the fertilizer comprises an N—P—K fertilizer having a high nitrogen content in the range from about 3.5:1:1 to about 8:1:1, by weight, and in which the nitrogen component is provided predominantly by ammonium ions and nitrate ions and substantially in the absence of urea.

14. The method according to claim 13 in which the N—P—K content of nitrogen to phosphorous to potassium comprises about 24-6-6.

15. The method according to claim 14 in which the ratio of methanol to fertilizer is about 1:1 to about 2:1 by volume.

16. The method according to claim 13 in which the ratio of methanol to fertilizer is about 1:1 to about 2:1 by volume.

17. The method according to claim 13 comprising applying the methanol fertilizer solution to the roots of $C_3$ and/or CAM plants and trees selected from the group consisting of citrus, cantaloupe, raspberry, strawberry, watermelon, beans, daylily, ferns, canna, lantana, Japanese maple, gardenia, pepper, lettuce, rose, tomato, cyclamen, dahlia, African violets, vinca, pansy, quince, clematis, papyrus, Chinese lantern, Iceland poppy, marigold and stock.

18. The method according to claim 13 in which the components of the fertilizer principally comprise ammonium nitrate, potassium nitrate and ammonium phosphate.

19. The method according to claim 13 in which the nitrogen component comprises from about 4 to about 8 times the potassium component and the phosphorous component, by weight.

20. A method of improving the growth characteristics of plants of the $C_3$ and CAM varieties comprising applying to the roots of the plant an aqueous solution containing methanol together with a fertilizer, and repeating the application at intervals during the growth cycle of the plant, in which the fertilizer comprises an N—P—K fertilizer having a high nitrogen content in the range from about 3.5 to about 8 times the potassium component and the phosphorus component, in which the nitrogen content of the fertilizer formulation is provided substantially in its entirety from ammonium nitrate, nitrate ions from potassium nitrate, and ammonium ions from ammonium phosphate, substantially in the absence of urea, in which the phosphorous component principally comprises the ammonium phosphate, and in which the potassium component principally comprises the potassium nitrate.

21. The method according to claim 20 in which the N—P—K content of nitrogen to phosphorous to potassium comprises about 24-6-6.

22. The method according to claim 21 in which the ratio of methanol to fertilizer is about 1:1 to about 2:1 by volume.

23. The method according to claim 20 in which the ratio of methanol to fertilizer is about 1:1 to 2:1 by volume.

24. The method according to claim 20 comprising applying the methanol/high nitrogen fertilizer solution to the roots of $C_3$ and/or CAM plants and trees selected from the group consisting of citrus, cantaloupe, raspberry, strawberry, watermelon, beans, daylily, ferns, canna, lantana, Japanese maple, gardenia, pepper, lettuce, rose, tomato, cyclamen, dahlia, African violets, vinca, pansy, quince, clematis, papyrus, Chinese lantern, Iceland poppy and, marigold stock.

25. The method according to claim 20 in which the nitrogen component comprises from about 4 to about 8 times the potassium component and the phosphorous component, by weight.

* * * * *